United States Patent

Seiler

[11] Patent Number: 5,121,648
[45] Date of Patent: Jun. 16, 1992

[54] DEVICE FOR DRIVING A SPINDLE FOR MOVING A PART WITHIN A MACHINE USED FOR PROCESSING PLATE-SHAPED WORKPIECES

[75] Inventor: Alain Seiler, Vevey, Switzerland
[73] Assignee: Bobst SA, Switzerland
[21] Appl. No.: 691,982
[22] Filed: Apr. 26, 1991

[30] Foreign Application Priority Data

Apr. 26, 1990 [CH] Switzerland .......................... 1417/90

[51] Int. Cl.⁵ .......................... F16H 27/02; F16H 7/02
[52] U.S. Cl. .................................. 74/89.15; 74/89.22; 74/665 GE; 474/62
[58] Field of Search ............... 74/89.15, 89.21, 89.22, 74/89.2, 665 GE, 665 H; 474/61, 62, 64, 66, 88, 148, 150

[56] References Cited

U.S. PATENT DOCUMENTS

| | | | |
|---|---|---|---|
| 1,955,398 | 4/1934 | Werner | 93/49 |
| 2,718,790 | 9/1955 | Hughey | 474/62 |
| 2,931,277 | 4/1960 | Bombard | 93/52 |
| 3,026,737 | 3/1962 | Berg | 74/229 |
| 3,365,966 | 1/1968 | Heyer | 474/62 |
| 3,493,233 | 2/1970 | Foufounis | 74/89.15 |
| 3,656,416 | 4/1972 | Baum | 93/52 |
| 3,821,906 | 7/1974 | Berg | 474/62 |
| 3,910,130 | 10/1975 | Traughber, Jr. | 74/89.22 |
| 4,315,751 | 2/1982 | Conrad | 474/154 |
| 4,516,303 | 5/1985 | Kloster | 74/89.15 X |
| 4,585,147 | 4/1986 | Wodnicki | 74/89.15 X |
| 4,842,233 | 6/1989 | Rusin | 74/89.15 X |
| 4,995,277 | 2/1991 | Yanagisawa | 74/89.15 |
| 4,995,278 | 2/1991 | Huang | 74/89.15 |

FOREIGN PATENT DOCUMENTS

| | | | |
|---|---|---|---|
| 166615 | 1/1950 | Austria | 74/89.22 |
| 2447486 | 4/1975 | Fed. Rep. of Germany | 74/665 GE |
| 2407069 | 5/1979 | France . | |
| 55-79357 | 5/1982 | Japan | 74/89.22 |
| 63-96350 | 4/1988 | Japan | 74/89.15 |

*Primary Examiner*—Allan D. Herrmann
*Assistant Examiner*—Julie Krolikowsky
*Attorney, Agent, or Firm*—Hill, Van Santen, Steadman & Simpson

[57] ABSTRACT

A drive device for simultaneously insuring a rotary motion of at least two spindles which are mounted in parallel within a machine comprises a shaft supported within the machine in such a way that it is situated in the vicinity of both spindles. A crank allows a rotation of one of the spindles. In the vicinity of each spindle, at least two pulleys are provided, with one being keyed to the shaft and one being keyed to the spindle and a toothed belt is twisted to extend between the two pulleys.

3 Claims, 1 Drawing Sheet

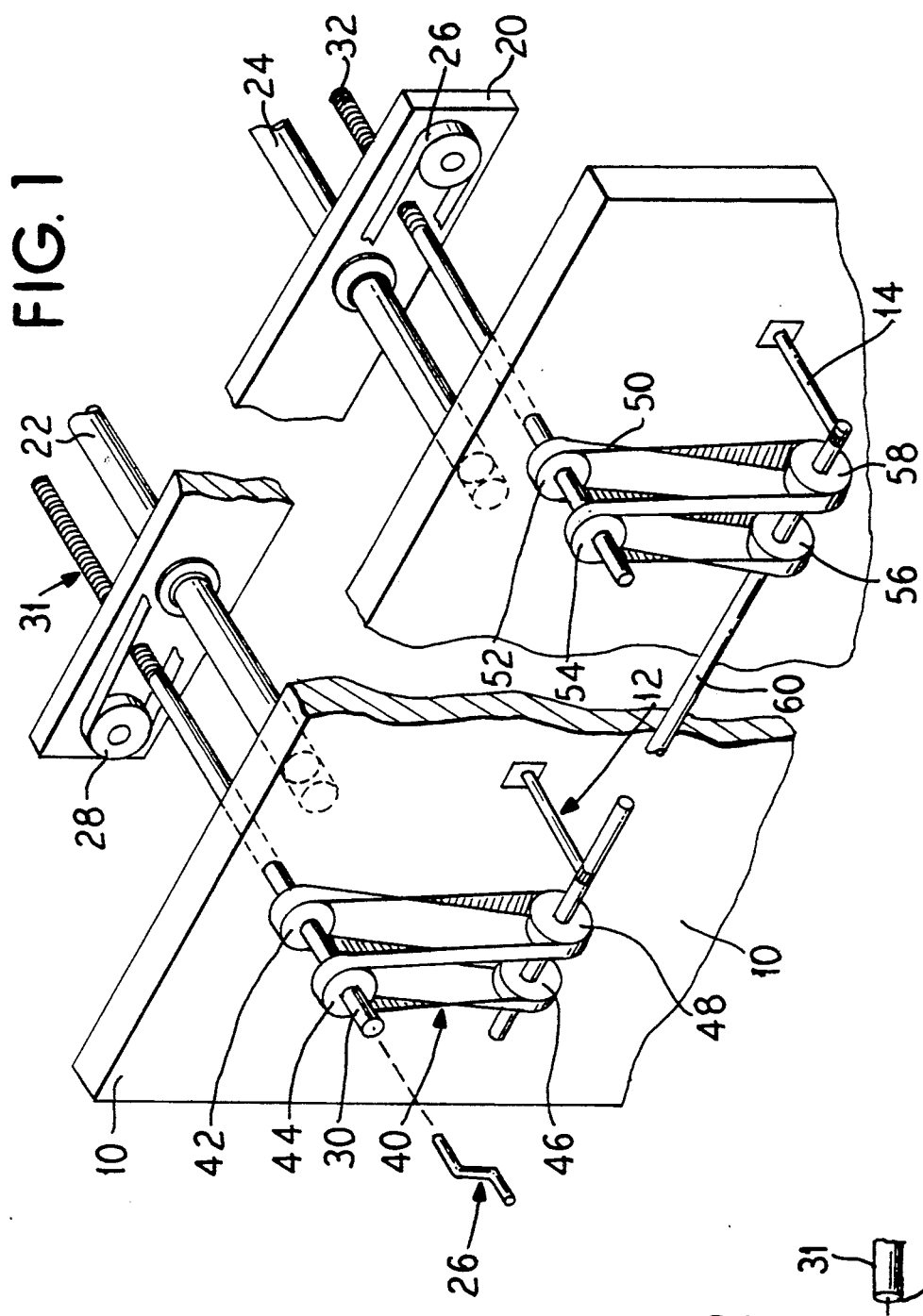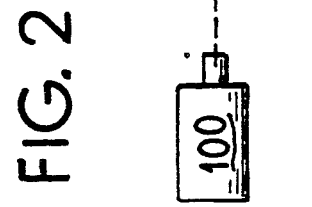

DEVICE FOR DRIVING A SPINDLE FOR MOVING A PART WITHIN A MACHINE USED FOR PROCESSING PLATE-SHAPED WORKPIECES

BACKGROUND OF THE INVENTION

The present invention is concerned with a drive device for insuring a lateral translatory shifting of a lengthwise part within a machine. The drive device includes two or more spindles, each having a threaded portion, which spindles are mounted in the machine to extend parallel to each other and for free rotation with their threaded sections or portions being threadably received in threaded apertures provided in the lengthwise part. The present invention concerns, especially, a device allowing a simultaneous rotation of all spindles engaged with a lengthwise part so as to have the lengthwise part accomplish a uniform lateral translatory shifting within the machine. Such a shifting device is particularly useful, for instance, though not exclusively, in a conveying station of a machine used for processing plate-shaped workpieces and including endless belt conveyors provided on lengthwise beams themselves mounted for sliding across on bearing surfaces provided on crossbars. The device allows a modification of the position of each lengthwise beam with regard to the machine frame, as required by changes in the size and dimensions of the blanks being processed.

At present, every spindle end is provided with a toothed wheel or sprocket and a chain is used for interconnecting these wheels or sprockets. In this way, every rotary movement applied to one of the spindles by means of, for instance, a crankshaft is automatically and consequentially applied to the other spindles. However, when the lengthwise part, which is to be shifted laterally, becomes particularly long, such as to support an endless conveyor with a length of more than 2.5 m, the spacing between the spindles is increased so that the chain might develop a certain backlash resulting in an unequal rotary movement for each spindle. As the lengthwise beam shifts crosswise, interferences and canting can occur and the lateral shift becomes jerky and very inaccurate. This will result in shifting the lengthwise beam somewhat beyond the position required and then necessitate a backward movement for a partial compensation of these inaccuracies. Thus, a successful shift will depend on the operator's experience.

SUMMARY OF THE INVENTION

The purpose of the present invention is to provide solutions to these previously-mentioned problems by setting forth a drive device for simultaneous rotation of at least two parallel spindles for shifting a part on a machine. The device insures a better coordination among the two spindles. Obviously, such a device would have to be of a sufficiently simple design to allow manufacture at a reasonable cost and to avoid unnecessary encumbering of the space within the machine frame.

These objects can be obtained by a drive device which is designed for driving at least two spindles which are mounted in parallel within a machine and enable lateral translatory shifting of a lengthwise part due to threaded portions of each of the spindles being engaged in threaded apertures of the lengthwise part. The driving device comprises a shaft arranged within the machine in the vicinity of both of the shifting spindles, means for driving one of the spindles or else the shaft, and a mechanical means allowing a transmission of the rotary motion of the shaft to every spindle.

By optimizing the other shaft parameters, as required by the necessary length, for instance its structure, its outer diameter or even its inner diameter in the event the shaft is a hollow shaft, it is possible to obtain a very slight distortion at the shaft end, which is easily comparable to the backlash inherent to a conventional chain. The mechanical means having features allowing a transmission of the rotary motion of the shaft to every spindle includes, in each proximity area between the shaft and spindle, a pair of identical toothed pulleys, of which one is permanently fixed or keyed to the shaft for a compulsory co-rotation, and the other on the spindle is equally compulsory co-rotated, as well as a twisted toothed belt as a link between the two pulleys. The use of toothed belts and pulleys for transmitting the torque over a, hence reduced, distance allows the accurate transmission of the initial motion with less cumbersome means manufacturable at reasonable cost. Moreover, with the transmission, thus, becoming more accurate, the lengthwise beam is practically no longer interfered with and the required mechanical effort becomes sufficiently less so that it is fairly easy to envision reduced dimensions for the shaft and pulleys.

Preferably, the shaft will have to be orientated orthogonally to the spindles and the mechanical means comprises, in each proximity area between the shaft and spindles, two pairs of identical toothed pulleys on the shaft, one of which is free-wheeling and the other which is keyed to the shaft, and two pulleys on the spindle, one of which is keyed to the spindle and one which is free-wheeling on the spindle. The toothed belt travelling successively from the permanently keyed pulley of the shaft to the free-wheeling pulley of the spindle, then to the free-wheeling pulley of the shaft and, finally, to the permanently keyed pulley of the spindle before returning to the permanently keyed pulley of the shaft.

If the distance between two pulleys is equivalent to the diameter of the latter pulleys, the belt will only carry out a quarter of a twist with each passage from one pulley to the other, which considerably increases its lifetime and the whole with minimal complexity.

Practically, the means insuring the rotary drive can be reduced to a simple crank or a portable motor, which can be coupled to an end of one of the spindles or to an end of the shaft.

Other advantages and features of the invention will be readily apparent from the following description of the preferred embodiments, the drawing and claims.

BRIEF DESCRIPTION OF THE DRAWINGS

FIG. 1 is a perspective view of a drive device in accordance with the present invention; and FIG. 2 is a side view of an end of the spindle with a drive motor attached.

DESCRIPTION OF THE PREFERRED EMBODIMENTS

The principles of the present invention are particularly useful when incorporated in a drive device for shifting a lengthwise beam 20 on crossbars 22 and 24 within a frame of a machine.

As illustrated, the lengthwise part or beam 20 holds an endless conveyor belt 26, which runs over at least two end pulleys 28. The lengthwise beam is mounted so as to be able to slide laterally along two crossbars 22 and 24, which are permanently mounted on a machine frame 10.

The lateral movement of the lengthwise beam 20 is controlled by two parallel spindles 31 and 32. Each of these spindles has a threaded section which is threadably engaged in corresponding threaded apertures provided in the lengthwise beam 20. The spindles are mounted for rotation in the frame 10, but are fixed against movement in a direction along their axes. Conspicuously, the link between the tapped or threaded apertures of the lengthwise beam 20 can be improved by the use of a ball or roller-bearing arrangement.

The drive device, which insures a simultaneous rotation of each of the spindles 31 and 32, includes a shaft 60, which is mounted for rotation on the frame 10 by several supports, such as 12 and 14. The shaft is mounted in such a way as to remain fixed during the lengthwise translatory shifting, but can rotate on its axis. The shaft 60 is situated in a vicinity of the spindles 31 and 32, i.e., at a distance of 20 cm to 50 cm. In addition, as clearly shown by the Figure, the shaft 60 is arranged horizontally along the frame 10, whereas the spindles 31 and 32 are arranged equally horizontally, though crosswise with regard to the same frame 10. Hence, the shaft 60 has an orthogonal position with regard to both spindles 31 and 32.

In the vicinity of the spindle 31, the shaft 60 is provided with a pair of toothed pulleys 46 and 48. The pulley 48 is keyed or cottered onto the shaft and, hence, held for compulsory co-rotation therewith. The other pulley 46 is mounted as a free-wheeling pulley. Correspondingly, the spindle 31 is also provided in the vicinity of the shaft 60 with a pair of toothed pulleys 42 and 44. The pulley 44 is cottered or keyed to the spindle and, thus, fixed. The other pulley 42 is mounted for free rotation. A belt 40 runs from one pulley to the other and, as illustrated, has a quarter of a complete twist between each of the pulleys. Thus, the belt, after it leaves the cottered pulley 48 on the shaft 60, will run or pass over the free-wheeling pulley 42 of the spindle, then back around the free-wheeling pulley 46 of the shaft and then back up and around the fixed pulley 44 before returning to the keyed pulley 48 of the shaft. Owing to this arrangement, any rotary movement imposed on the spindle 31 by means of a crank 26 applied to an end 30 of the spindle 31 is immediately and integrally transmitted to the shaft 60. In a like manner, any rotation of the shaft 60 will be immediately transferred to the spindle 31. A similar device exists with two pairs of toothed pulleys 52, 54 and 56, 58 and a toothed belt 50 between the shaft 60 and the second shifting spindle 32. The rotary motion imposed on the shaft 60 is, thus, also transmitted integrally to the shifting spindle 32.

Since the shaft 60 and the drive devices between the shaft and each of the spindles are identical, it is conspicuous that actuating the crank 26 on the spindle 31 or the spindle 32 will lead to the same result. If the space requirements of the other mechanical elements of the frame allow it, it might also be useful to act directly on the shaft 60 with the crank 26. Instead of the crank 26, a small portable electric motor 100 (FIG. 2) could be used as an alternative, with the shaft of the motor being fixed directly to an end 30 of the spindle 31.

Although various minor modifications may be suggested by those versed in the art, it should be understood that I wish to embody within the scope of the patent granted hereon all such modifications as reasonably and properly come within the scope of my contribution to the art.

I claim:

1. In a device for rotating simultaneously at least two spindles which are mounted to extend parallel within a machine for processing plateshaped workpieces, said spindles enabling a lateral translatory shifting of a lengthwise part due to an engagement of a threaded section of each spindle with a tapped aperture in said lengthwise part, the improvements comprising said device including a shaft being arranged within the machine in the vicinity of both spindles, means for selectively rotating one of said spindles and said shaft and mechanical means for transmission of rotary motion of the shaft to each of said spindles, said mechanical means including each spindle having a toothed belt and a pair of toothed pulleys with one pulley of each pair being free-wheeling on the spindle and the other pulley being keyed to the spindle, and said shaft having a separate pair of toothed pulleys adjacent each spindle with one pulley of each pair being keyed to the shaft and the other pulley being free-wheeling on the shaft, said belt of each spindle engaging the pair of pulleys of the spindle and the adjacent pair of pulleys of the shaft and having only a quarter turn between each pulley.

2. In a device according to claim 1, wherein the means for selectively rotating is a crankshaft having means for coupling it to an end of said spindle.

3. In a device according to claim 1, wherein an means for selectively rotating is said portable motor having means for coupling it to the end of a spindle.

* * * * *